United States Patent [19]
Klotz

[11] Patent Number: 5,251,351
[45] Date of Patent: Oct. 12, 1993

[54] COMBINATION TOOL, IN PARTICULAR FOR MOTOR VEHICLES

[76] Inventor: Manfred Klotz, Friedrich-List-Strasse 25, 4790 Paderborn, Fed. Rep. of Germany

[21] Appl. No.: 773,665
[22] PCT Filed: Jan. 18, 1991
[86] PCT No.: PCT/EP91/00083
  § 371 Date: Oct. 23, 1991
  § 102(e) Date: Oct. 23, 1991
[87] PCT Pub. No.: WO91/12981
  PCT Pub. Date: Sep. 5, 1991

[30] Foreign Application Priority Data
Feb. 23, 1990 [DE] Fed. Rep. of Germany ....... 4005690

[51] Int. Cl.$^5$ ................................................ B25F 1/00
[52] U.S. Cl. ........................................ 7/100; 7/158; 7/170; 15/105
[58] Field of Search ............................ 7/100, 158, 170; 15/105, 236.02

[56] References Cited
U.S. PATENT DOCUMENTS
3,670,459 6/1972 Welton ............................... 7/100 X FOREIGN PATENT DOCUMENTS
8401917 3/1984 Fed. Rep. of Germany.

Primary Examiner—James G. Smith
Attorney, Agent, or Firm—Browdy and Neimark

[57] ABSTRACT

The combination tool, in particular for motor vehicles, has an ice scraper (2) and or a squeegee (3) for removing moisture, an emergency hammer (4) and/or a cutting element (5) and/or a sharpening element (6) for wiper blades and/or a container (7) for a slip and/or lubricating agent on a handle (1). In addition to the known functions of ice scraping and/or water removal, this combination tool allows one or several additional functions, namely the function as an emergency hammer, belt cutter, wiper blade sharpener and lubrication agent dispenser, because of which as a whole it results in the performance of a total of six different functions and is therefore usable in a versatile way.

26 Claims, 6 Drawing Sheets

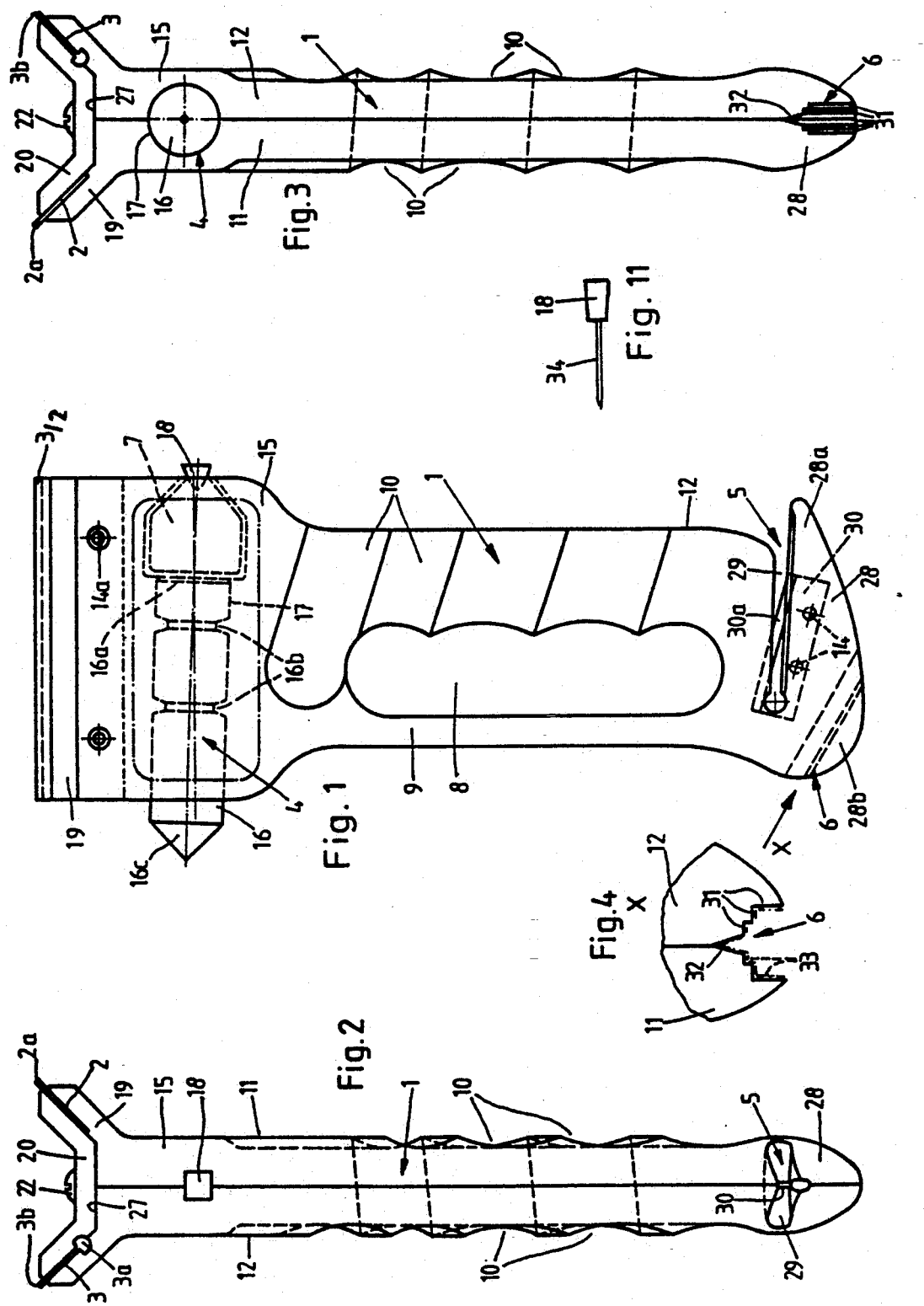

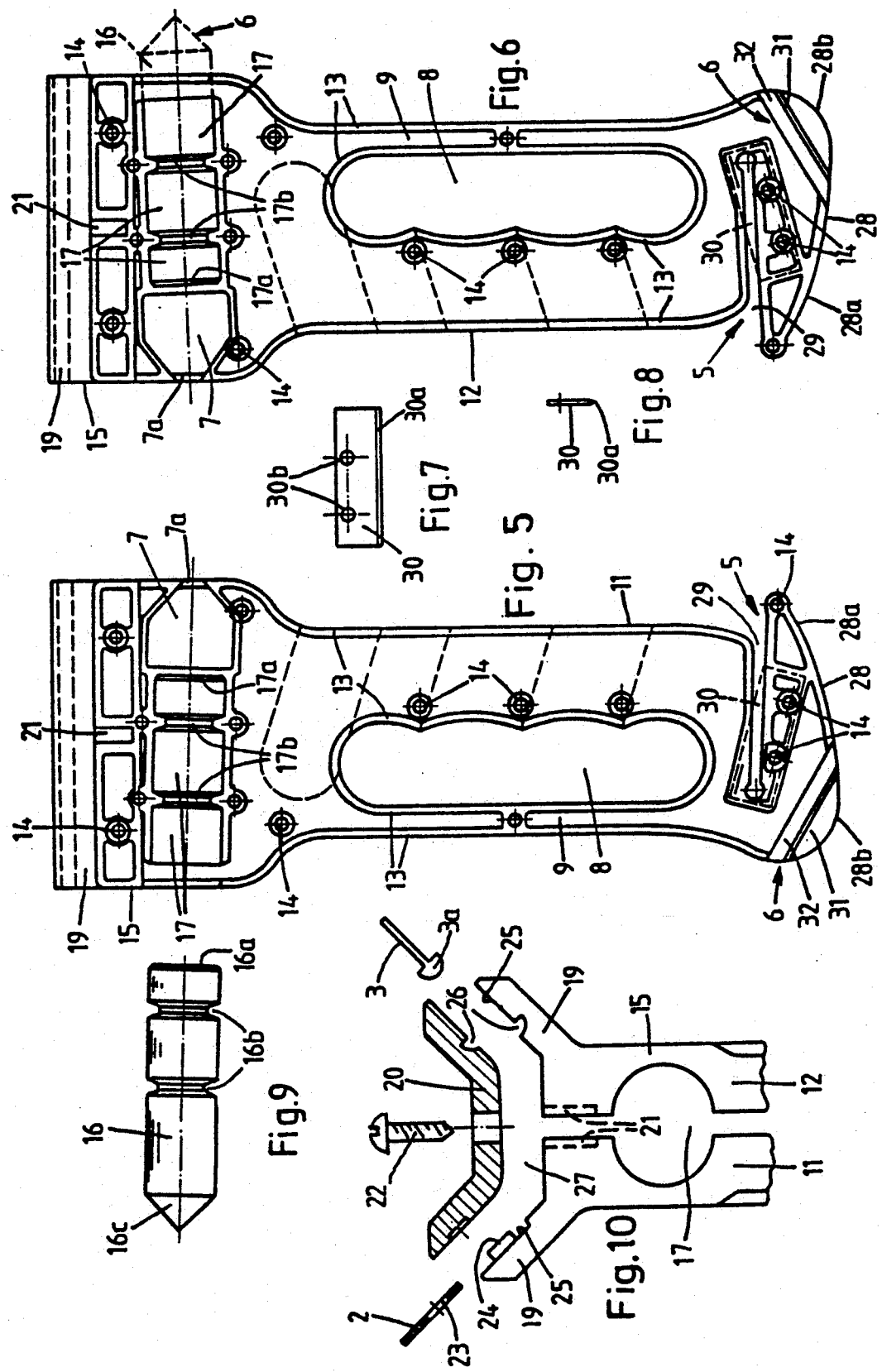

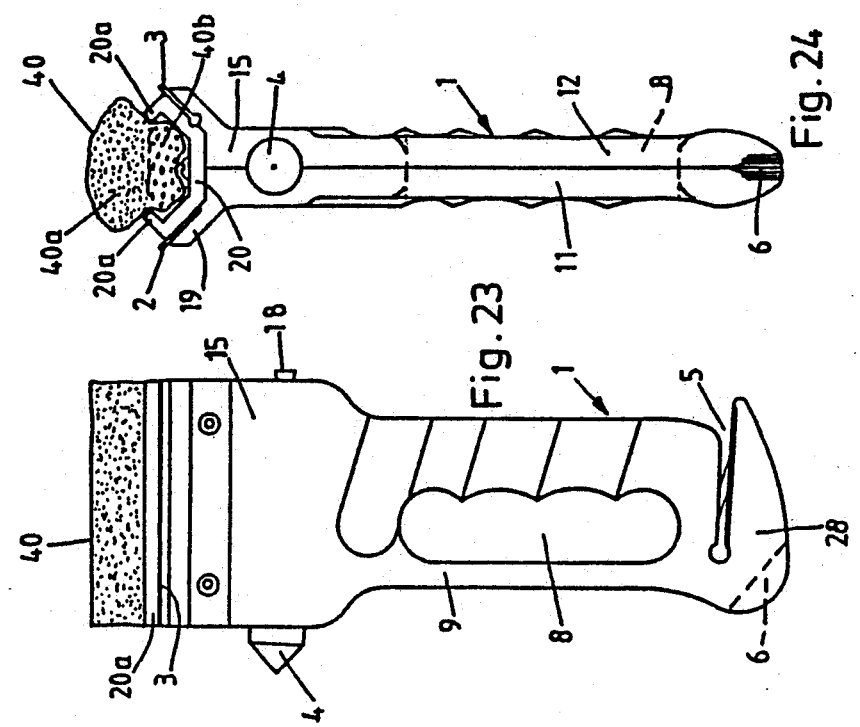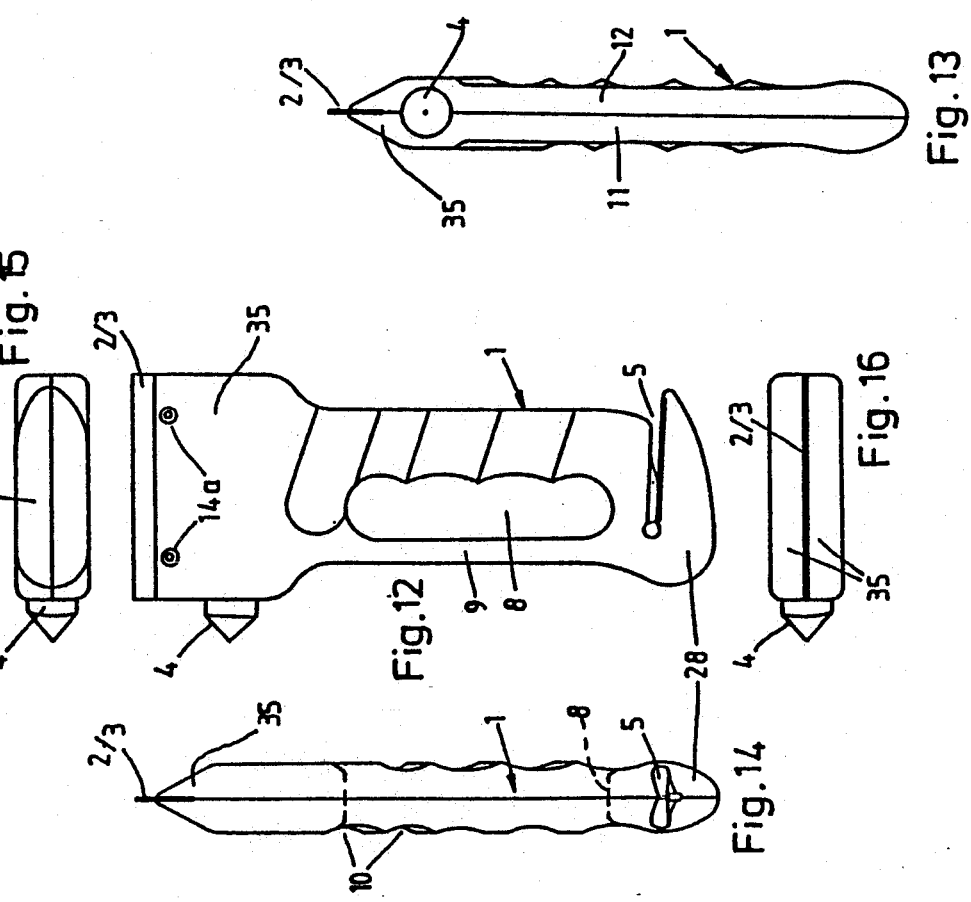

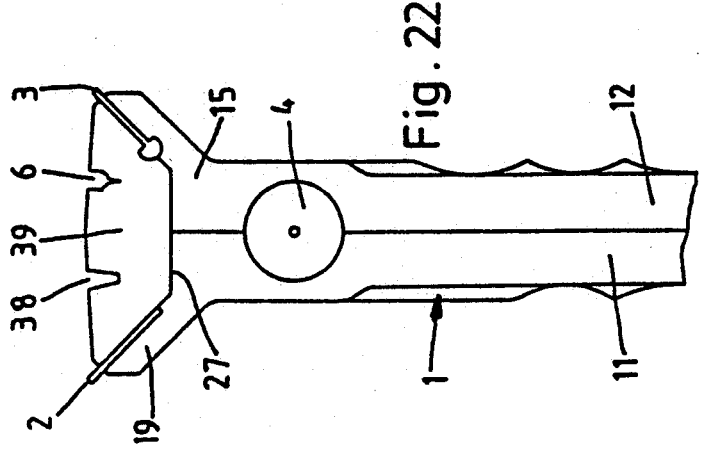
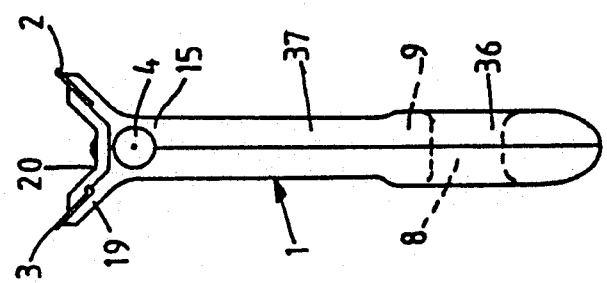
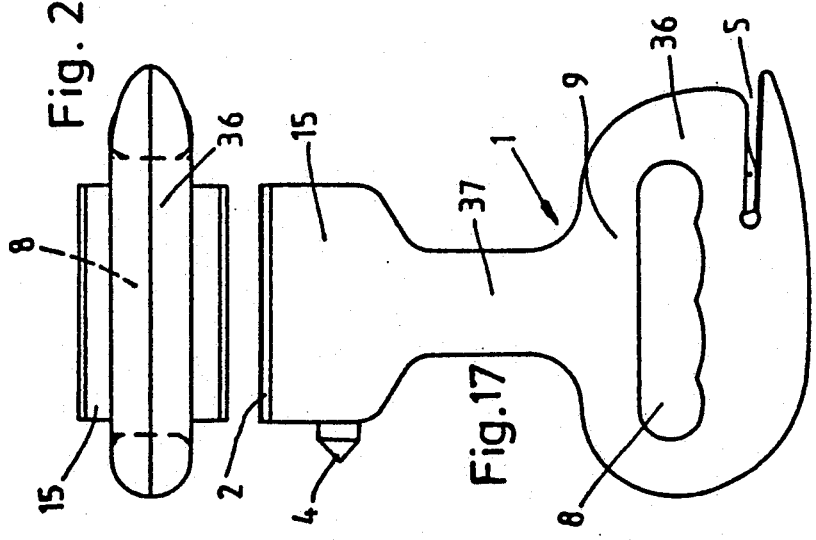
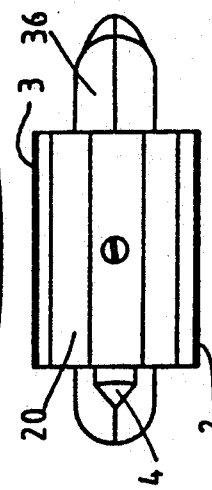
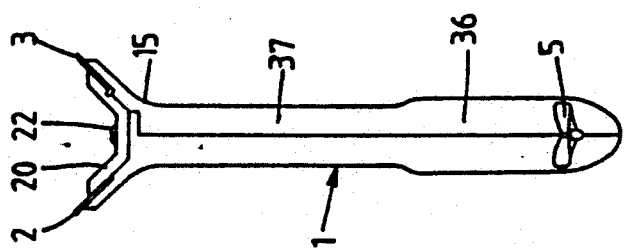

COMBINATION TOOL, IN PARTICULAR FOR MOTOR VEHICLES

BACKGROUND OF THE INVENTION

Field and Objectives of the Invention

The invention relates to a manual combination tool, in particular for motor vehicles, with an ice scraper and/or a squeegee for moisture removal disposed on a handle.

Such combination tools are known in various embodiments as tools with handles or in the shape of plates or frames and only allow one of two functions, namely the removal of water and the scraping of ice from the window glass of the motor vehicles.

It is the object of the invention to provide a combination tool which can additionally fulfill at least one further function, preferably a plurality of different helpful functions, while being simply and inexpensively constructed, being easy to manipulate and having an increased useful value. removal, the combination tool in accordance with the invention furthermore makes possible another or a plurality of additional functions and in its totality permits the performance of altogether six different functions.

SUMMARY OF THE INVENTION

This combination tool is simply and inexpensively constructed, permits easy manipulation and results in increased useful value because of its many functions.

The advantages of the combination tool are as follows:

1. In one longitudinal end section of the handily designed handle are disposed the ice scraper, the squeegee, the emergency hammer and a container for a slip and lubricating agent, and a cutting element and a sharpening element are provided in the other longitudinal end section.

2. The ice scraper and the squeegee for removing moisture are placed opposite each other in an advantageous manner and diverge towards the exterior, so that they can be easily used separately.

3. A striking bolt for use as an emergency hammer is securely and permanently fixed at several attachment points in the handle and may have a striking point or a flat striking surface and is used for breaking the window glass in an emergency or can be used for small repairs of the motor vehicle.

4. The handle has a cutout for the fingers which, on the side of the emergency hammer, is covered by a protective bar, so that injury to the fingers by glass shards or other parts is prevented when using the emergency hammer—because of this the combination tool is additionally embodied protected against accidents in its use.

5. Various slip and lubricating agents, in particular talcum powder for rubbing into rubber gaskets, can be stored in the container, formed by a molded chamber and closed by a removable stopper, so that this slip or lubricating agent is always at hand and can be easily blown out in a directed manner by a pump formed by a deformable bellows disposed on a handle shell of the handle.

6. The cutting element has an advantageously positioned knife blade and is used in particular for cutting the seat belts in the car in case of emergency, however, it can also be used for cutting ribbons, twine, or the like.

7. By means of the sharpening element the user has the opportunity to re-sharpen the worn windshield wiper blades, so that the life of the windshield wiper blades can be extended in this way. This sharpening element is removable, is preferably held displaceably on both handle shells by means of a groove and spring connection and can thus be used as a separate part for sharpening purposes.

8. Besides employment of the combination tool in connection with the motor vehicle, it can also be used in the household for removing moisture from window panes, as emergency hammer for hammering in nails or the like, for cutting string, paper, etc. and for sharpening knives, scissors or the like.

9. The handle is formed by two mirror-reversed, one-piece shell halves, which are provided with molded connection means, can be manufactured simply and cost-effectively and, with the individual tools inserted, can be easily combined into a unit. The connection of the two handle shells is made by clip closures gripping each other and additionally in one longitudinal section by a hook connection and in the other longitudinal section by the sharpening element pushed on it.

10. The stopper releasably closing off the container with the slip and/or lubricating agent is provided with a nozzle needle fixed thereon, which allows cleaning and adjusting of the spray nozzles of the windshield washer.

11. The handle can furthermore have a crosswise extending hand grip, which allows the hand to slip through and grip it from above during use.

12. It is furthermore possible to provide the tool head in the area next to the ice scraper and/or squeegee with an exchangeable sponge having areas of different stiffness, which makes possible the cleaning of surfaces to which particles of dirt adhere by means of the stiff sponge area and cleaning or wiping off the surfaces with the soft sponge area.

BRIEF DESCRIPTION OF THE DRAWINGS

Exemplary embodiments in accordance with the invention are shown in the drawings and will be described in detail below. Shown are in:

FIG. 1, a frontal view of a combination tool with an ice scraper, squeegee, emergency hammer, talcum powder container, belt cutter and wiper blade sharpening element disposed in/on a handle, FIG. 2, a lateral view of the combination tool in accordance with FIGS. 1 from the right side, showing the ice scraper, squeegee, talcum powder container and the belt cutter, FIG. 3, a lateral view of the combination tool in accordance with FIG. 1 from the left side, showing the ice scraper, squeegee, emergency hammer and sharpening element, FIG. 4, a frontal view of the sharpening element in accordance with FIG. 1 in the direction of the arrow X, FIGS. 6 and 6, an internal view of the two mirror-reversed halves of the handle, FIGS. 7 and 8, a lateral view and a frontal view of a knife blade of the cutting element, FIG. 9, a lateral view of the emergency hammer bolt removed from the handle, FIG. 10, a lateral, partially cut and exploded view of the handle, the ice scraper and the squeegee, as well as of a fastening section fixing the ice scraper and the squeegee on the handle, FIG. 11, a lateral view of a stopper with a nozzle needle, closing off the talcum powder container, FIGS. 12 to 16, a frontal view, two lateral views, a bottom view and a top view of a combination tool with only one squeegee or one ice scraper, FIGS. 17 to 21, a frontal view, two lateral views, a bottom view and a top view of a combination tool with crosswise extending hand grip, FIG. 22, a lateral view of the combination tool in a further embodiment with an ice scraper, talcum powder discharge groove, sharpening element and squeegee disposed in its head, FIGS. 23 and 24, a frontal view and a lateral view of the combination tool with a sponge additionally disposed between the ice scraper and the squeegee, FIGS. 25 to 27, frontal views of the combination tool in accordance with FIGS. 1 and 17 showing the ways of gripping it, FIG. 28, a frontal view of the combination tool with pump and releasable sharpening element, FIG. 29, a lateral view of the same combination tool, FIG. 30, a longitudinal section of the same combination tool with the pump and with the hook connection, plug connection and sharpening element keeping the two handle shells releasably together.

DETAILED DESCRIPTION OF THE PREFERRED EMBODIMENTS

Figure 27:
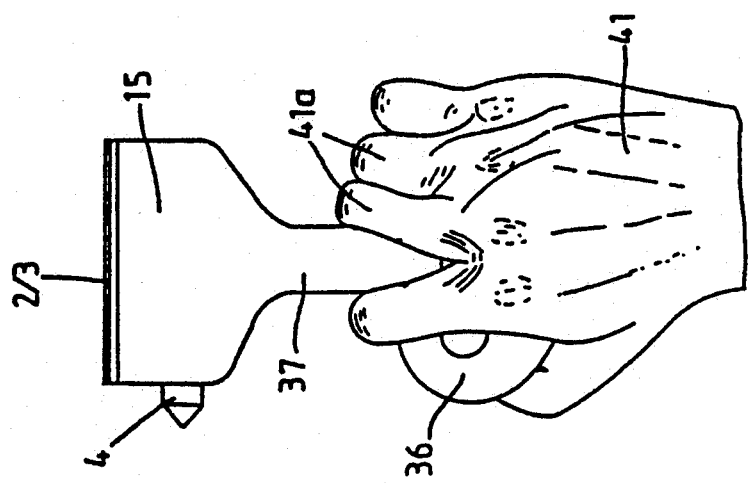

A handle of a manual combination tool, in particular for motor vehicles, is designated with (1), on/in which an ice scraper (2), a squeegee (3) for removal of moisture, an emergency hammer (4), a cutting element (5), a sharpening element (6) and a container (7) for a slip and/or lubricating agent are disposed, so that this tool performs altogether six functions.

The handle (1) is formed by an elongated gripping body having in its two end sections the individual tools (2 to 7) and having between them a molded, elongated finger cutout (8) extending in the longitudinal direction of the handle.

On the long side of the handle next to the emergency hammer (4), this finger cutout (8) forms a protective bar (9) for the fingers, so that, when the combination tool is used as a hammer, the fingers are protected against shards of glass or the like or against hitting the striking surface.

In addition, the handle (1) has in the area of its circumference opposite the protective bar (9) gripping grooves (10) for the fingers, molded on the exterior in the area of the finger cutout (8), so that the combination tools can be easily and securely gripped and held in the finger cutout (8).

In a longitudinal end section of the handle (1) extending in the longitudinal direction of the tool, the combination tool shows the ice scraper (2), the squeegee (3), the emergency hammer (4) and the container (5), and in the opposite longitudinal end section the cutting element (5) and the sharpening element (6).

The handle (1) is formed of two mirror-reversed handle shells (-halves) (11, 12), which interlock overlappingly by means of beaded edges (13) extending along the outer edge and around the finger cutout (8) and which are releasably kept together by means of internally molded clip closures (14) formed of interlocking bushes and plugs. It is also possible to connect the two handle shells (11, 12) by screws or by screws (14a) and clip closures.

In a widening (15) of the shells on the ends of the handle (1) (both handle shells (11, 12)), which forms a tool head, a striking bolt (16) of metal is inserted in the longitudinal direction of this widening (15) to form the emergency hammer (4), which extends from the handle (1) on that side on which the protective bar (9) is also disposed.

In its longitudinal direction the striking bolt (16) extends at right angles, preferably at a slightly obtuse angle, to the longitudinal direction of the protective bar (9), inclined in the direction towards the ice scraper (2) and the squeegee (3).

An insertion chamber (17) is molded into the two handle shells (11, 12), into which the striking bolt (16) has been inserted in a form-fitting manner and fixed in place. The striking bolt (16) has a circular cross section and is cylindrical in the longitudinal direction, and the insertion chamber (17) is correspondingly made of two semicircular grooves.

The insertion chamber (17) and the striking bolt (16) have a plurality of attachment points, formed by the bottom (17a) of the chamber (17) and by two or more molded ribs (17b), by the front end (16a) and by cut out annular grooves (16b) of the striking bolt (16), for the secure and extended support of the striking bolt (16) in the handle (1) and for the dispersed absorption of the striking forces. In this way the front face (16a) of the striking bolt (16) rests against the chamber bottom (17a) and the ribs (17b) engage the circular grooves (16b) of the striking bolt (16).

The striking bolt (16) has a striking point (16c) on its end extending out of the handle (1). However, it can also be provided with a flat striking surface.

It is furthermore possible to shape the insertion chamber (17) with the ribs (17b) and the striking bolt (16) with its annular grooves (16b) in such a way, that it can be selectively inserted into the handle (1) in two positions, i.e. either with the point (16c) on the outside or with the point (16c) on the inside.

A further chamber molded into both handle shells (11, 12) follows the chamber bottom (17a) and forms the container (7). This chamber (7) has an opening (7a) on the side of the handle opposite the striking bolt (16), which is closed off by a stopper (18).

The most diverse slip and/or lubricating agents, preferably talcum powder, for coating the rubber gaskets of the motor vehicle or door lock deicers for the motor vehicle can be stored in this container (7), so that the user will always have an appropriate agent at his disposal, which he can easily take from the container (7) after removal of the stopper (18).

On its widening (15), each gripper shell (11, 12) has a molded attachment bar (19), extending over the entire length of the widening and oriented obliquely outward. In the connected state of the handle shells (11, 12), both attachment bars (19) give the handle (1) a trapeze-shaped groove (27), which is engaged by a fastening section (20) for the releasable fixing of the ice scraper (2) and the squeegee (3), which section is releasably held on the handle (1) by at least one screw (22) extending into a molded hole (21) of the handle shells (11, 12).

The ice scraper (2) is formed by a metal plate extending over the entire length of the attachment bar (19), and rests against a step (25) on the attachment bar (19) and extends by means of two fixing holes (23) over molded tangs (24), so that the metallic ice scraper (2) is fixed in position between the attachment bar (19) and the fastening section (20).

The squeegee (3) consists of a strip-shaped rubber section extending over the entire length of the attachment bar (19) and has a bead (3a) along one longitudinal edge which engages corresponding cut out grooves (26) of the attachment bar (19) and the fastening section (20) for fixing it in place. The squeegee (3) also lies in a step (25) of the attachment bar (19).

In accordance with the grip groove (27) formed by the attachment bars (19), the fastening section (20) has a trapeze-shaped cross-sectional profile, which engages the grip groove (27) in a positively locked manner and which presses the ice scraper (2) and the squeegee (3) lockingly against the attachment bars (19) after the screw (22) has been tightened.

The ice scraper (2) and the squeegee (3) extend with the working rim edges (2a, 3b) out of the attachment bars (19) and the fastening section (20). The other long end of the handle (1) is formed into a hook (28), in which rest the cutting element (5), particularly as belt cutter, and the sharpening element (6), in particular for wiper blades.

The hook (28) extends over the width of the handle and thus in the longitudinal direction of the oppositely located widening (15), and the nose (28a) of the hook extends past the handle (1) on one long side, namely on the side of the handle with the gripping grooves (10) for the fingers, and together with the handle (1) forms an insertion slit (29) into which extends a metallic knife blade (30) of the cutting element (5).

This knife blade (30) with a rectangular shape of the blade extends in its longitudinal direction obliquely to the longitudinal direction of the insertion slit (29), so that a cutting edge (30a) is created, which narrows the slit (29) in the shape of a wedge.

The knife blade (30) is fixed between the two handle shells (11, 12) by means of two clip closures (14) which extend through two holes (30b) of the knife blade (30).

The knife blade (30) can also be formed by a round blade (knife wheel) or a hooked blade.

The sharpening element (6) is located, facing away from the insertion slit (29), in the area of arc (28b) of the handle hook (28) and extends obliquely and similar to the oblique position of the knife blade (30).

This sharpening element (6) is formed by a plurality of cut out steps (31) and a cut out sharpening wedge (32), where the same amounts of steps (31) and a portion of the sharpening wedge (32) are cut out in both handle shells (11, 12).

The sharpening wedge (32) is located in the center and the steps (31) adjoin it and form the groove-like sharpening element (6) which increases in width and is open towards the exterior.

It is possible to form the surface of the sharpening wedge (32) and the steps (31) by eroding the material of the handle shells or to provide it by means of a rough coating (33) generating a sharpening effect, such as an emery coating, metal coating, or the like.

Wiper blades of various width or other rubber or plastic parts can be re-sharpened or re-ground by means of the structured sharpening element (6), which in itself is stepped.

Both handle shells (11, 12) are each shaped of one piece from plastic or a light metal (aluminum).

In accordance with FIG. 11, the stopper (18) for closing off the talcum powder chamber (7) is provided with a nozzle needle (34) which is embedded (injected) in the plastic stopper (18) and ends in a point at its free longitudinal end. It is possible by means of this nozzle needle (34) to clean the spray nozzles of the windshield washer installation and to adjust their spray position conveniently, where the stopper (18) provides a grip.

The stopper (18) is inserted or screwed into the opening (7a).

FIGS. 12 to 24 illustrate variants of the combination tool in accordance with FIGS. 1 to 11, which will be described in detail below, where the same reference numerals are being used for identical parts.

The combination tool in accordance with FIGS. 12 to 16 is equipped either with only a squeegee (3) or only with an ice scraper (2) in its widened tool head (35). In this case the tool head (35) is in the shape of a fin and the squeegee (3) or the ice scraper (2) lie in the joint of the two shell halves (11, 12) and extend out of the point of the fin of the tool head (35).

The combination tool in accordance with FIGS. 17 to 21 is provided with a handle (1) having a crosswise oriented hand grip (36) with a crosswise extending finger cutout (8), on the protective bar (9) of which the tool head (15) is formed over a connecting piece (37).

This hand grip (36) shows the cutting element (5) and, if desired, the sharpening element (6), which are then disposed opposite each other corresponding to the tool according to FIG. 1. The crosswise extending hand grip (36) preferably has an oval basic shape.

In FIG. 22 an output groove (38) for talcum powder and the sharpening element (6) are disposed in the tool head (15) between the ice scraper (2) and the squeegee (3). In this case the fastening section (20) is, in accordance with FIG. 10, in the form of a trapeze-shaped insertion piece (39), which grips the groove (27) between the attachment bars (19) for fixing the ice scraper (2) and the squeegee (3) and is releasably held there by means of fastening means, not shown, such as screws.

The talcum powder chamber (7) (not shown) is also located in this insertion piece (39) and is in communication with the output groove (38), and the sharpening element (6) is cut out. The talcum powder chamber (7) can also be cut out of the tool head (15) and in this case is in communication with the groove (38) via a pass-through. By means of this slit-shaped groove (38), extending over the entire width of the insertion piece (39) in the longitudinal direction of the ice scraper (2), it is easily possible to coat gaskets in the motor vehicle with talcum powder, since this groove (38) extends over the gaskets and glides over the gaskets when the tool is moved.

FIGS. 23 and 24 illustrate the combination tool in accordance with FIG. 1, however, with an added sponge (40) in the tool head (15) between the ice scraper (2) and the squeegee (3).

In this case the fastening section (20) has a cross section in the shape of a letter C and the ends (20a) of the C created in this way engage the sponge (40) for fastening it.

The sponge (40) preferably consists of a softer and a stiffer sponge area (40a, 40b) and can be inserted as needed (using the soft part (40a) or the stiff part (40b)) into the fastening section (20), i.e. its position can be changed. In this case there is also a possibility to insert in the head (15) either only the squeegee (3) or the ice scraper (2) next to the sponge (40).

Figure 25:
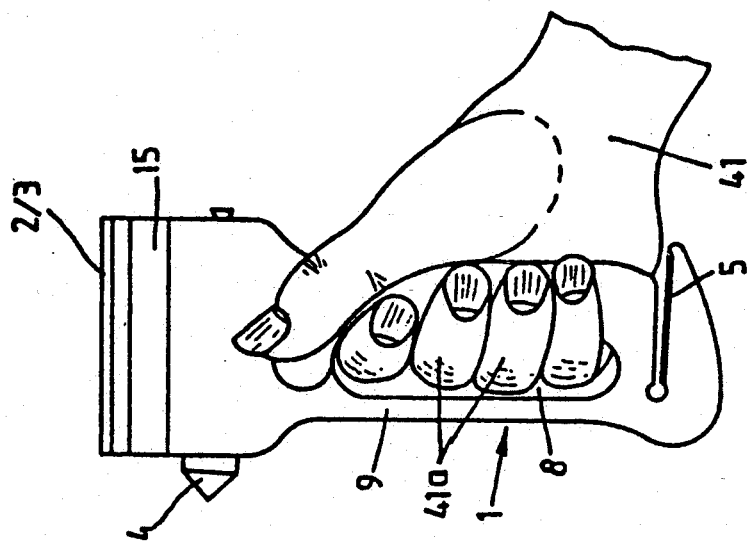

FIG. 25 shows the combination tool in accordance with FIGS. 1 or 12 or 23 in an illustration where it is gripped by a hand (41), the fingers (41a) of the hand (41) engaging the gripping grooves (10) through the cutout (8) and being protected by the protective bar (9).

Figure 26:
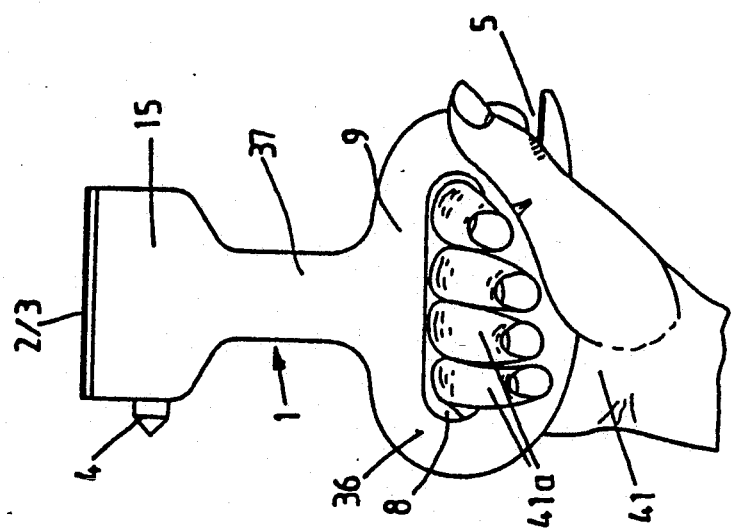

The same gripping position is shown in FIG. 26 with the tool in accordance with FIG. 17, where the fingers grip the crosswise extending grip (36) and take this position when the tool is used as emergency hammer (4) and are protected all around by the grip (36). For scraping ice or removing moisture, the hand (41) can extend with the fingers over the grip (36) and grasp the piece (37), as shown in FIG. 27, so that in this gripping possibility easy pushing or pulling of the tool across the surface to be cleaned is provided.

Figure 29:
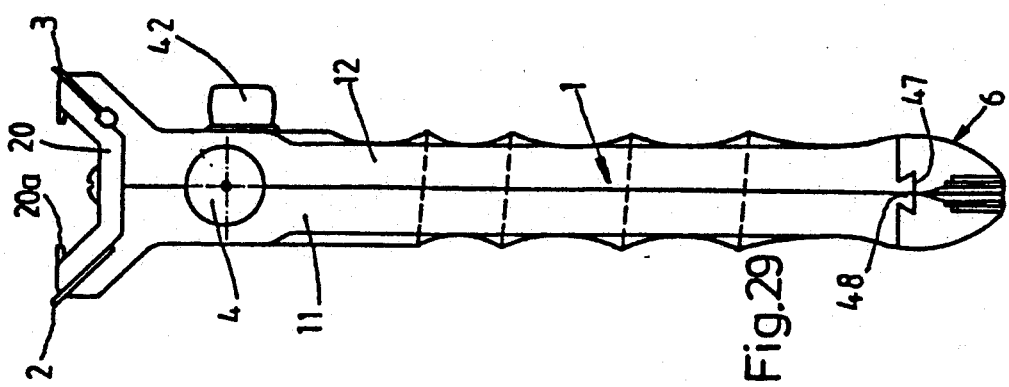
Figure 28:
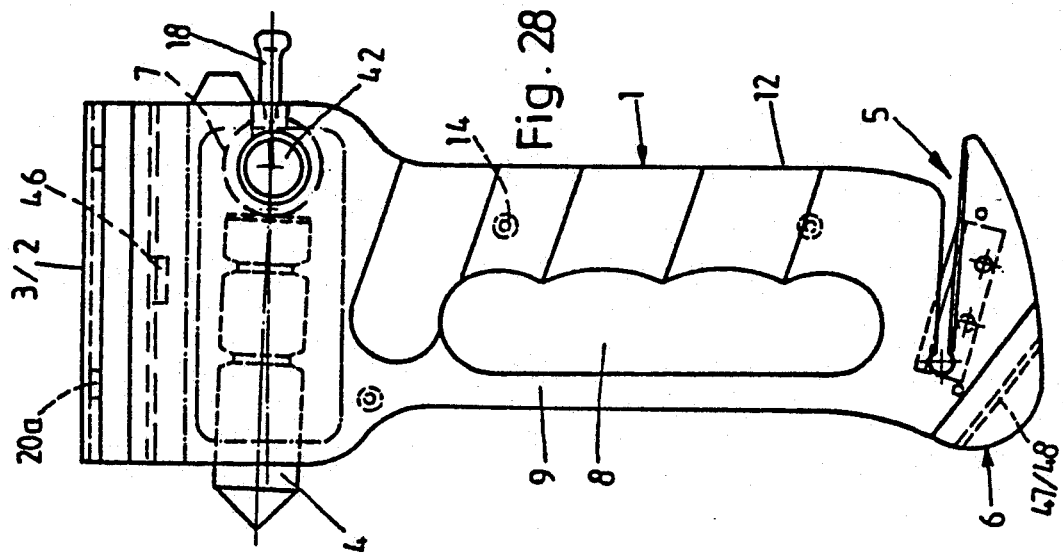
Figure 30:
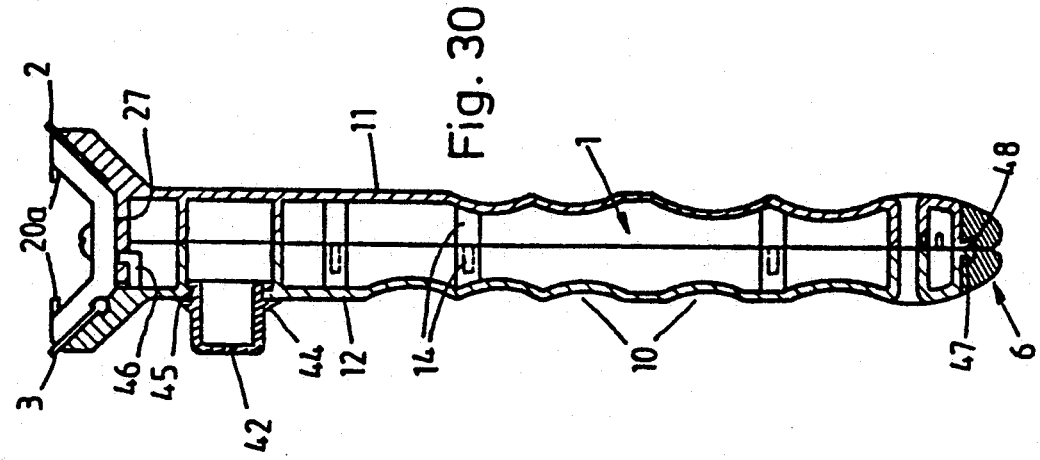

In FIGS. 29 to 30, the combination tool is embodied with a pump (42) on its slip and/or lubricating agent container (7) for blowing the slip and/or lubrication agent out of the container opening (7a).

This container (7) is formed by two cylinder rings (43) molded on the inside of the handle shells (11, 12), which abut with their open front ends and form a closed, cylindrical chamber with a circular cross section, from which the opening (7a) extends.

The pump (42) is formed by a cup-shaped bellows of an elastic and/or flexible material, preferably rubber or plastic.

This pump bellows (42) is fastened with a support edge (44) formed on its open cup side in a hole (45) of the container (7) on a handle shell (11) or (12).

By pressure of the hand (or a finger) on the pump bellows (42) the latter is deformed and, when the stopper (18) has been removed, the slip and/or lubricating agent is blown out of the opening (7a) by the pressure thus created. The pump bellows (42) always returns into its cup-shaped initial position.

In addition to the interlocking bush- and tang-like clip closures (14), the two shell halves (11, 12) are also held together by a hook connection and the releasable sharpening element (6).

For this purpose at least one hook (46) is formed on a handle shell (11) or (12) below the grip groove (27), which engages from below a hole cut out of the grip groove (27) of the other handle shell (12) or (11) and in this way keeps the two handle shells (11, 12) together in one longitudinal end section.

The sharpening element (6) is embodied as a removable plastic part which is fixed by means of a groove and spring connection (47, 48) on both handle shells (11, 12) and in this way keeps both handle shells (11, 12) together in the other longitudinal end section.

On each one of the two handle shells (11, 12) half of the cross section of an undercut spring (48) (strip) is formed and both spring halves together result in a spring (48) having a dovetailed cross section, on which the sharpening element (6) is pushed with a dovetail-shaped groove (47).

The fastening section (20) is provided with a plurality of molded bars (20a) engaging the sponge (40) for the purpose of additional fastening of a sponge (40).

I claim:

1. A combination tool, in particular for motor vehicles, having an ice scraper and/or squeegee for moisture removal disposed on a handle, said tool further comprising:

an emergency hammer (4) on said handle (1) disposed adjacent to said ice scraper (2) and/or said squeegee (3);

a cutting element (5) and a wiper blade sharpener (6) mounted on said handle (1) at a distance from said emergency hammer (4);

a molded finger cutout (8) between said emergency hammer (4), and said cutting element (5) and said wiper blade sharpener (6);

said molded finger cutout (8) forming a protective bar (9) for fingers on a side of said handle from which said emergency hammer (4) extends.

2. A combination tool in accordance with claim 1, wherein said handle (1) has a first tool group at a first end comprising said ice scraper (2), said squeegee (3), said emergency hammer (4) and a container for slip and/or lubricating agents (7), and has, at a second end, a second tool group comprising said cutting element (5) and said wiper blade sharpener (6); said emergency hammer (4) and said cutting element (5) respectively positioned opposite to one another one said first end and said second end of said handle.

3. A combination tool in accordance with claim 2, wherein said handle (1) is formed by an elongated, double-shelled grip body, and said molded finger cutout (8) extends in a longitudinal direction of said handle between said first tool group (2, 3, 4, 7) and said second tool group (5, 6) as a longitudinal mold.

4. A combination tool in accordance with claim 1, wherein said handle (1) has, on an area opposite said protective bar (9), grip grooves (10) for said fingers, molded on an outside of said area.

5. A combination tool in accordance with claim 2, wherein said handle (1) has at said first end a tool head (15) formed by a widening, said ice scraper (2), said squeegee (3), said emergency hammer (4) and said container for slip and/or lubricating agents (7) disposed on said widening, said handle having a hook-shaped portion on said second end, said cutting element (5) located on a first side of said hook-shaped portion and said wiper blade sharpener (6) located on an opposite side of said hook-shaped portion.

6. A combination tool in accordance with claim 2, wherein said handle (1) is formed of two handle shells (11, 12), each made of one piece of plastic or light cast metal, which are embodied mirror-reversed and have beaded edges (13) extending along an outer edge and around said finger cutout (8), which interlock overlappingly and which are releasably kept together by means of internally molded clip closures (14) formed of interlocking bushes and plugs.

7. A combination tool in accordance with claim 6, wherein a striking bolt (16) of metal is inserted in an insertion chamber (17) of said tool head (15) at said first end of said handle (1) and formed at an end of each of said two handle shells (11, 12) for forming said emergency hammer (4), which extends crosswise, and preferably inclined in relation to a longitudinal direction of said handle (1).

8. A combination tool in accordance with claim 7, wherein corresponding portions of said insertion chamber (17) are molded in said two handle shells (11, 12) for a positive reception of said striking bolt (16), said insertion chamber having a chamber bottom (17a) and at least one chamber rib (17b), against and in which said striking bolt (16) abuts with a bolt striking surface and at least one annular groove (16b), forming striking bolt attachment points.

9. A combination tool in accordance with claim 8, wherein said striking bolt (16) of said emergency hammer (4) has a pointed striking surface (16c) at a first end and a flat striking surface at a second end, said striking bolt being alternatively insertable in said insertion chamber (17) to allow either said pointed striking surface or said flat striking surface to extend out of said insertion chamber.

10. A combination tool in accordance with claim 7, wherein said two handle shells (11, 12) form chamber elements of said container for slip and/or lubricating agents (7), said elements fitting together coaxially in relation to said striking bolt insertion chamber (17), said container for slip and/or lubricating agents being disposed for receiving slip and/or lubricating agents, preferably talcum powder, having on a side opposite said side from which said emergency hammer (4) extends, an output opening (7a), which can be closed off by a stopper (18).

11. A combination tool in accordance with claim 6, wherein each of said two handle shells (11, 12) has on said tool head (15) a molded attachment bar (19), extending over an entire width of said tool head and directed obliquely outward therefrom, each said attachment bar (19) together providing said handle (1) with a trapeze-shaped groove (27), which is engaged by a fastening section (20) and which is releasably held on said handle (1) by at least one screw (22) engaging said two handle shells (11, 12), and which exchangeably maintains the ice scraper (2) and the squeegee (3) between itself and said each said attachment bar (19).

12. A combination tool in accordance with claim 11, wherein said ice scraper (2) is formed by a metal plate extending over an entire length of a first of said each said attachment bar (19) and lying in a step (25) on said first of said each said attachment bar (19) and extends with two fixing holes (23) across molded tangs (24) of said first of said each said attachment bar (19) and is fixed in position between said first of said each said attachment bar (19) and said fastening section (20).

13. A combination tool in accordance with claim 12, wherein said squeegee (3) consists of a strip-shaped rubber section extending over an entire length of a second of said each said attachment bar (19) and has a head (3a) along one longitudinal edge, where the bead (3a) engages corresponding cut out grooves (26) of said second of said each said attachment bar (19) and said fastening section (20) for fixing it in place, and that the squeegee (3) lies in a step (25) of said second of said each of said attachment bar (19).

14. A combination tool in accordance with claim 5, wherein a longitudinal length of said hook-shaped portion (28) of said handle (1) extends over the width of said handle and parallel to a longitudinal length of said tool head (15), and a nose (28a) of said hook-shaped portion extends past said area opposite said protective bar and forms together with said handle (1) an insertion slit (29), into which extends a metallic knife blade (30) of said cutting element (5), a longitudinal direction of which extends obliquely to a longitudinal direction of said insertion slit (29), forming a wedge-shaped cutting edge (30a).

15. A combination tool in accordance with claim 14, wherein said knife blade (30) is fixed between said two handle shells (11, 12) by means of two clip closures (14) which extend through two holes (30b) of said knife blade (30).

16. A combination tool in accordance with claim 14, wherein said wiper blade sharpener (6) extends, facing away from said insertion slit (29), in an area of an arc (28b) of said hook-shaped portion (28) and extends obliquely in relation to said arc (28b).

17. A combination tool in accordance with claim 16, wherein said wiper blade sharpener (6) is formed by a plurality of cut out steps (31) and a cut out sharpening wedge (32), where a same number of said steps (31) and a portion of said sharpening wedge (32) are cut out in each of said two handle shells (11, 12).

18. A combination tool in accordance with claim 17, wherein an apex of said sharpening wedge (32) is located on a juncture of said two handle shells (11, 12) and said steps (31) adjoin a base of said sharpening wedge (32) to form said wiper blade sharpener (6) which is groove-like and increases in width and is open towards an exterior of said hook-shaped portion.

19. A combination tool in accordance with claim 18, wherein a surface of said sharpening wedge (32) and said steps (31) are provided with a rough surface (33) to permit sharpening, said surface formed by erosion thereof, an emery coating, metal coating or the like.

20. A combination tool in accordance with claim 10, wherein said stopper (18) for said container for slip and/or lubricating agents (7) is pushed or screwed into said output opening (7a) and is provided with a nozzle needle (34) for cleaning and adjusting spray nozzles of a windshield washer installation.

21. A combination tool in accordance with claim 20, wherein said handle (1) has a widened tool had (15) in the shape of a fin, from a fin point of which extend an ice scraper (2) or a squeegee (3).

22. A combination tool in accordance with claim 1, wherein said handle (1) is formed by a hand grip (36) having an oval basic shape and a finger cutout with a longitudinal length transverse to a longitudinal length of said tool, said handle having a tool head (15) fastened on a connecting piece (37) molded on a protective bar (9) of said hand grip, said cutting element (5) and/or said wiper blade sharpener (6) being disposed in said hand grip (36).

23. A combination tool in accordance with claim 5, wherein said handle (1) has on said tool head (15), beside said ice scraper (2) and/or said squeegee (3), a one-piece sponge (40) having a softer and a harder area (40a, 40b), which is supported exchangeably and releasably in a fastening section (20) having a cross section in the shape of a C.

24. A combination tool in accordance with claim 10, wherein a pump (42), made of a rubber or plastic bellows, for blowing a slip and/or lubricating agent out of said container for slip and/or lubricating agents (7) is disposed on one of said two handle shells (11 or 12) in an area of said container for slip and/or lubricating agents (7).

25. A combination tool in accordance with claim 6, wherein said wiper blade sharpener (6) is maintained releasably on said two handle shells (11, 12), preferably by means of a groove and spring connection (47, 48) with an undercut cross section, so it can be pushed off.

26. A combination tool in accordance with claim 6, wherein said two handle shells (11, 12) are releasably kept together in an area of said ice scraper (2) and said squeegee (3) by means of a hook connection (46) formed on and in said handle groove (27) and by a push-on connection (47, 48) of said wiper blade sharpener (6).

* * * * *